Aug. 1, 1939.  B. STECHBART ET AL  2,168,054
INTERMITTENT STRIP FEED MECHANISM AND THE LIKE
Original Filed Feb. 2, 1934  2 Sheets-Sheet 2

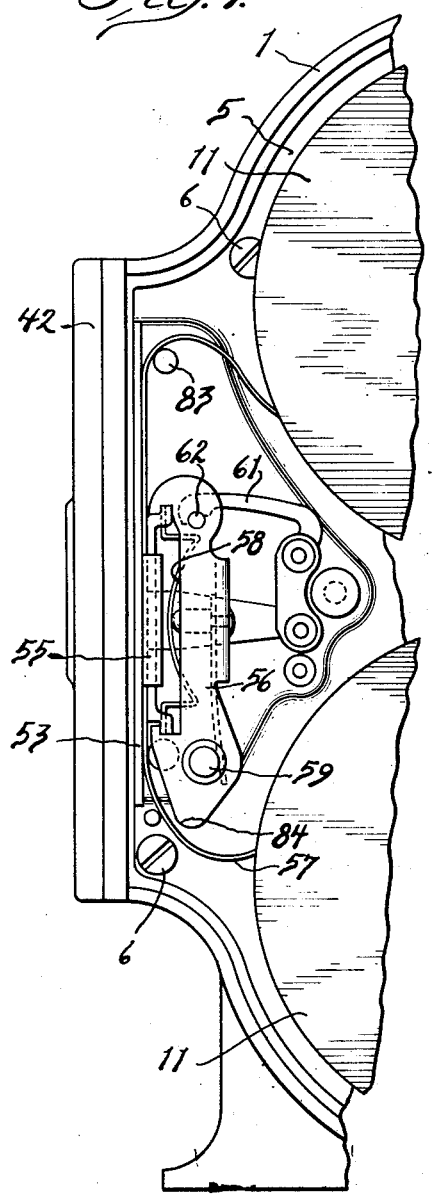
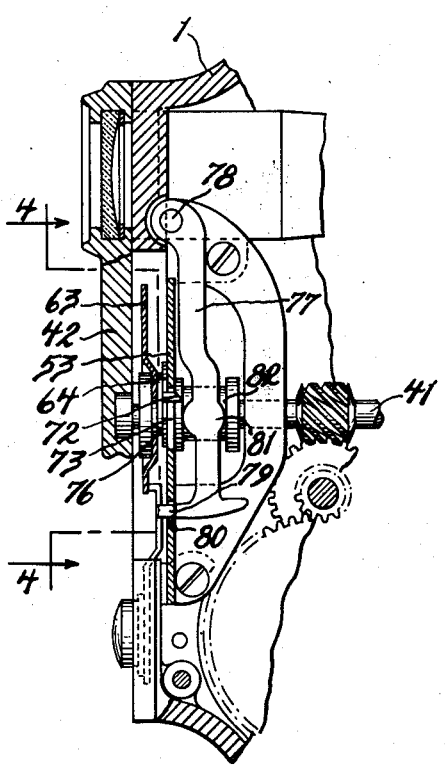

Inventors:
Bruno Stechbart &
George A. Brueske
By: Robert F. Miehle
Atty.

Patented Aug. 1, 1939

2,168,054

UNITED STATES PATENT OFFICE 2,168,054

INTERMITTENT STRIP FEED MECHANISM AND THE LIKE

Bruno Stechbart and George A. Brueske, Chicago, Ill., assignors to The Bell & Howell Company, Chicago, Ill., a corporation of Illinois Original application February 2, 1934, Serial No. 709,468. Divided and this application December 1, 1937, Serial No. 177,528

1 Claim. (Cl. 88—18.4)

Our invention relates particularly to motion picture apparatus although not limited to this use alone.

The general feature of our invention relates to the provision of novel, relatively simple and effective intermittent strip feed mechanism which is particularly adapted for the feeding of motion picture film strips and more particularly for the feeding of motion picture film strips in motion picture apparatus described in our U. S. patent application, Serial No. 709,468, filed February 2, 1934, for improvement in Motion picture camera and the like, of which this application is a division.

With this feature in view our invention consists in certain features of novelty in the construction, combination and arrangement of parts by which the said feature and certain other features are effected, all as fully described with reference to the accompanying drawings and more particularly pointed out in the appended claim.

In the said drawings—

Figure 1 is a side elevation of a partial side elevation of a motion picture camera embodying our invention and having the cover or door of the camera casing removed;

Figure 2 is a partial sectional view in elevation similar to Figure 1;

Like characters of reference indicate like parts in the several views.

Figure 3:
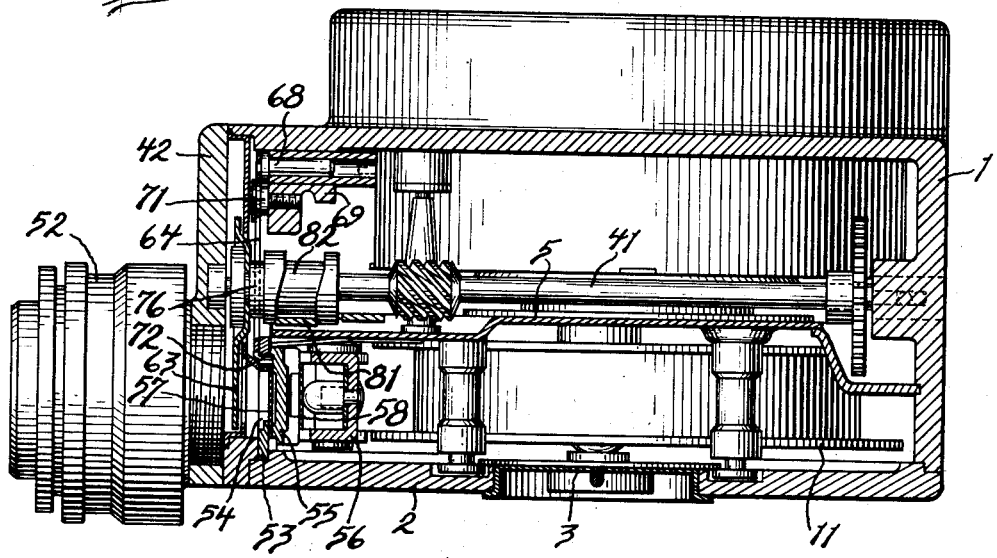
Figure 3 is an intermediate sectional view taken in a horizontal plane.

Referring to the drawings, 1 designates a casing which is open at one side, and said open side is closed by a cover 2 releasably secured to the casing by a locking mechanism 3. See Figures 1, 2 and 3.

A frame plate 5 is secured in the casing intermediate and in parallelism with the sides thereof by headed screws 6. See Figures 1 and 3.

The portion of the enclosure of the casing adjacent the open side thereof forms the film chamber of the casing, and vertically spaced revoluble film reels 11 are removably mounted within the film chamber in a suitable manner.

Driving mechanism is arranged in the casing and includes a forwardly and rearwardly extending shaft 41 which is mounted for rotation in suitable bearings on the back wall of the casing and the front wall of the casing which is formed by a detachable front piece 42.

A photographic lens 52 is mounted in an aperture through the front piece 42 intermediate the top and bottom of the casing 1 and is disposed on an axis alined with the film chamber, and disposed in the film chamber at the forward intermediate portion thereof is an exposure apertured intermittent film feed guide comprising a front face guide plate 53 provided with an exposure aperture 54 alined with the lens and a rear guide device consisting of a rear face guide member 55 mounted on a bracket 56 and yieldably urged forwardly to engage a film 57 between it and the plate 53 by a spring 58, the bracket 56 being pivoted on a downwardly disposed transverse stud 59 mounted on the frame plate 5 and held in forward film retaining position by a notched spring arm 61 engaging a stud 62 on the upper end of the bracket which is releasable to permit rearward tilting of the bracket 56 carrying the rear guide member 55 for the lacing of the film. See Figures 1 and 3.

A segmental light shutter 63 is secured on the forward portion of the shaft 41 in a plane between the front piece 42 and the front guide plate 53 and serves to intermittently cut off the exposure light at the exposure aperture for the exposure of successive sections of the film in the guide as it is fed therethrough by an intermittent film feeding mechanism now to be described. See Figures 2 and 3.

An elongated feed shuttle 64 of flat form is provided with a correspondingly elongated aperture 65 providing parallel opposing surfaces 66 extending longitudinally thereof. See Figures 3, 4 and 5. The shuttle is provided with a bearing aperture 67 at one end which is pivotally engaged on an eccentric stud 68 disposed on a forwardly and rearwardly extending axis and mounted in a bored boss 69 at the inside of the closed side of the casing 1 intermediate the top and bottom thereof, a headed and shouldered screw 71 screw-threaded into the boss 69 serving to retain the aperture 67 engaged on the stud 68.

The shuttle 64 is so mounted for pivotal movement in its plane and is disposed in a vertical plane between the shutter 63 and the front guide plate 53 and is arranged transversely. The other end of the shuttle is provided with a rearwardly projecting ratchet tooth 72 projecting through a vertical slot 73 in the guide plate 53 for engagement with marginal perforations 74 of the film 57 in the guide for intermittently feeding the film with reciprocation of the shuttle, the ratchet tooth 72 effecting downward feeding movement of the film with downward movement of the shuttle and the tooth disengaging from the engaged perforation and sliding over the film on the upward movement of the shuttle for engagement with another perforation, the shuttle flexing normal to its plane for engaging and disengaging the film perforations.

Figure 4:
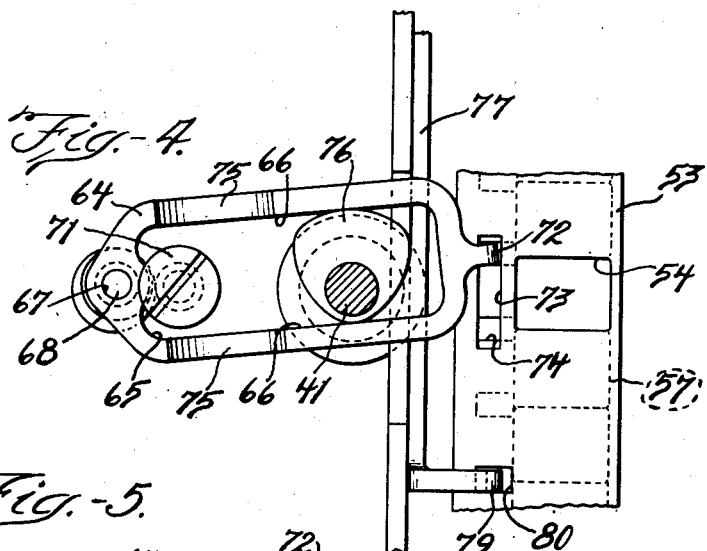
Figure 4 is a partial sectional view substantially on the line 4—4 of Figure 2.
Figure 5:
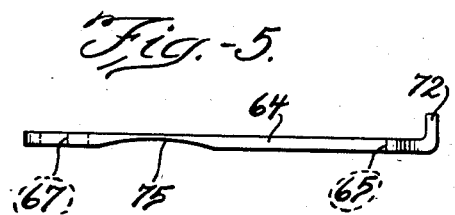
Figure 5 is a top plan view of the intermittent film feed shuttle of our invention.

In order that the shuttle 64 flexes normal to its plane without undue strain, it is reduced normal to the plane thereof adjacent its pivotal axis, as designated at 75 in Figures 4 and 5.

The shaft 41 extends through the aperture 65 of the shuttle 64 and has a radial cam 76 formed thereon which oppositely engages the opposing surfaces 66 of the aperture 65 to reciprocate the shuttle with rotation of the shaft, this cam being timed with the shutter 63 so that the movement periods of the film take place when the exposure aperture 54 is covered by the shutter.

A pilot member 77 is pivoted on a transverse axis, as designated at 78, and extends downwardly therefrom and is provided at its lower end with a rearwardly projecting pilot tooth 79 which in the rearward position of the member 77 projects through an aperture 80 through the front guide plate and engages an aperture 74 of the film for registering the film during the rest or exposure periods in the feeding movement thereof. See Figures 2 and 4.

The member 77 is provided at its intermediate portion with a partially circular portion 81 which is engaged in the slot of a drum cam 82 formed on the shaft 41, so that the member 77 is reciprocated in timed relation with the shuttle 64 to alternate therewith in the control of the film by alternate engagement with perforations thereof, so that the film is at all times under positive control in the exposure guide.

The film in the camera is fed from the upper reel 11 over a stud 83 mounted on the frame plate 5 above the film guide and downwardly to the upper end of the film guide and is fed from the lower end of the film guide to the lower reel upon which it is wound as usual, the film being guided to the lower reel by a guide formation 84 on the lower end of the bracket 56. See Figure 1.

Having thus described our invention, we do not wish to be limited to the precise details described as changes may be readily made without departing from the spirit of our invention, but having thus described our invention, we claim as new and desire to secure by Letters Patent the following:

An intermittent feed mechanism including a ratchet toothed shuttle pivoted for feeding movement in a plane corresponding with that of a perforated strip fed thereby and having a portion adjacent the pivotal axis thereof reduced in cross section for the flexing thereof normal to said plane to engage and disengage perforations of the strip, a revoluble member operative upon said shuttle to oscillate the same in said plane, a toothed pilot member pivoted for strip perforation engaging and disengaging movement, and means fixed with said revoluble member for actuating said pilot member in timed relation with said shuttle.

BRUNO STECHBART.
GEORGE A. BRUESKE.